Figure 1:
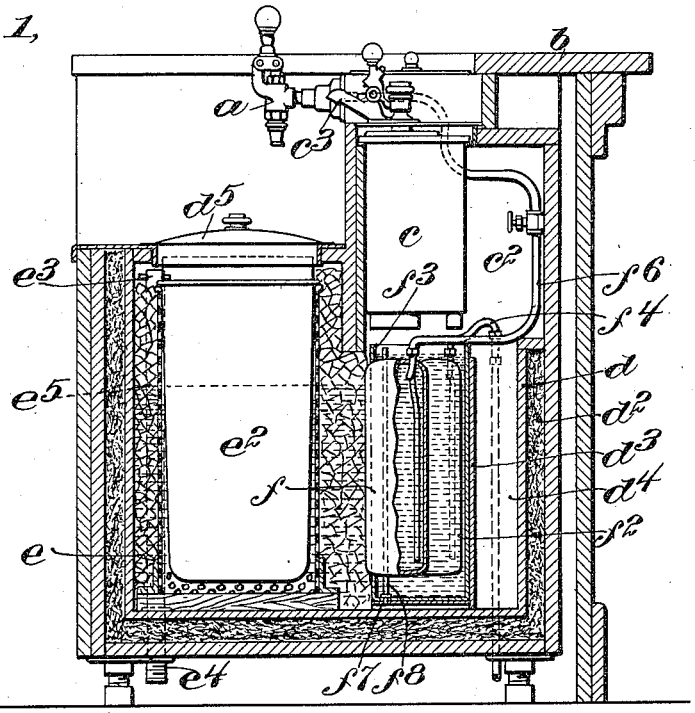

E. E. MURPHY.
DISPENSING APPARATUS.
APPLICATION FILED FEB. 9, 1910.

1,013,045.

Patented Dec. 26, 1911.

2 SHEETS—SHEET 1.

Witnesses:
Jas. F. Maloney

Inventor:
Edward E. Murphy
by H. J. Swinney
Atty.

E. E. MURPHY.
DISPENSING APPARATUS.
APPLICATION FILED FEB. 9, 1910.

1,013,045.

Patented Dec. 26, 1911.
2 SHEETS—SHEET 2.

UNITED STATES PATENT OFFICE.

EDWARD E. MURPHY, OF WINCHESTER, MASSACHUSETTS, ASSIGNOR TO PUFFER MANUFACTURING COMPANY, A CORPORATION OF MAINE.

DISPENSING APPARATUS.

1,013,045.  Specification of Letters Patent.  Patented Dec. 26, 1911.

Application filed February 9, 1910. Serial No. 542,893.

*To all whom it may concern:*

Be it known that I, EDWARD E. MURPHY, a citizen of the United States, residing in Winchester, in the county of Middlesex and State of Massachusetts, have invented an Improvement in Dispensing Apparatus, of which the following description, in connection with the accompanying drawings, is a specification, like letters on the drawings representing like parts.

The present invention relates to a dispensing apparatus, and is embodied in an apparatus of the class which is commonly known under the general name of soda fountain, which, at present, usually comprises a dispensing counter, dispensing faucets, and cases below and behind the counter to contain syrup jars, coolers for mineral waters of various kinds, and an ice cream cooler.

The present invention relates mainly to a novel arrangement whereby the plain carbonated water, as well as such mineral waters as may be used, are cooled by the ice or freezing mixture which is used in connection with the ice cream cooler, these parts being now usually kept separate, and separately cooled.

In accordance with the invention, the coolers for the waters, which consist of cylindrical receptacles constituting ducts or passages or tubes through which the water is caused to circulate as it flows from the source of supply to the dispensing faucets, are contained in a small tank or box, made of metal or other material which is a good conductor of heat, this small tank being located in the main tank or chest which contains the salted ice or other freezing mixture used to cool the ice cream. This small tank or container, as it may be called, is preferably arranged partly below and partly behind the dispensing counter, the water cooler being preferably below the counter, while the ice cream cooler is behind the counter, so that the top of the ice cream cooler is easily accessible. The water cooling container is shown as generally rectangular in shape, the rear wall of said container constituting the front wall of the ice receptacle, while the front wall of the container is separated from the front wall of the main chamber by an air space, which tends to equalize the temperature and prevent the water from freezing in the pipes. In the construction shown, the cooler for the plain soda, which is used in much greater quantities than the mineral waters, is composed of a series of cooling cells or ducts through which the water is caused to circulate by a suitable piping system, and these cells are arranged next to that wall of the container which lies in contact with the ice; and the external surfaces of the ducts extend through said wall to some extent so that the ice is actually in contact therewith. The coolers for the mineral waters are shown as individual cooling units, these units, however, not being arranged to lie in actual contact with the ice, for the reason that they are of smaller capacity, while the water therein is less frequently drawn and has more time to cool. The container is adapted to be filled with liquid, preferably water, which wholly surrounds the cooling ducts and tends to equalize the temperature throughout the container.

Figure 2:
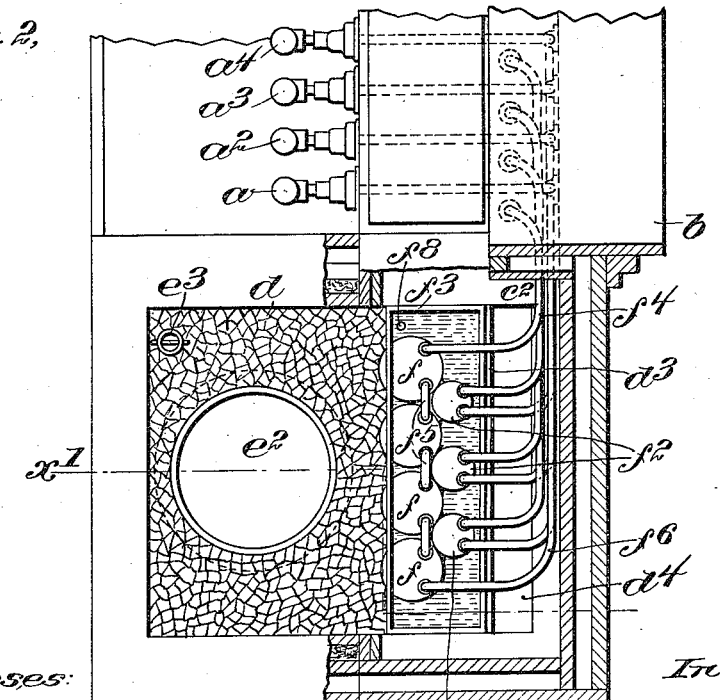
Figure 3:
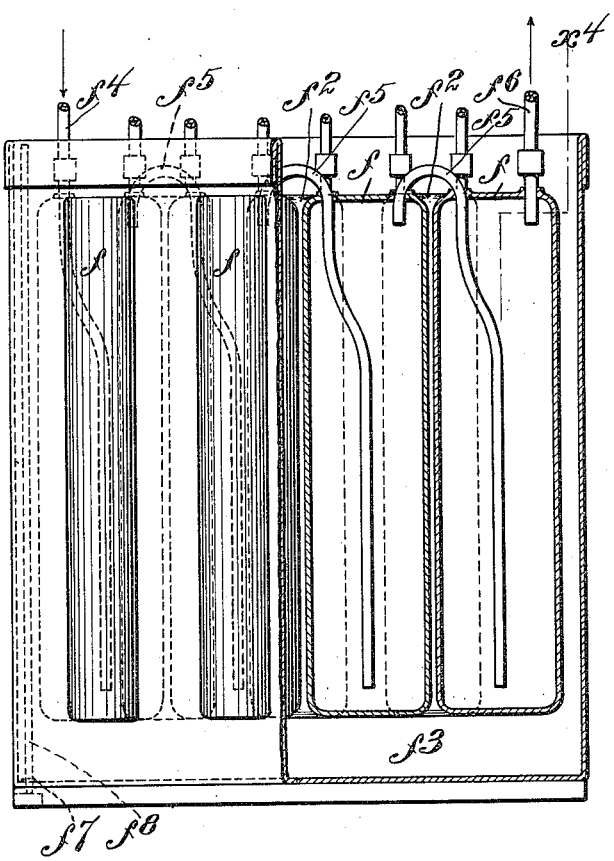
Figure 4:
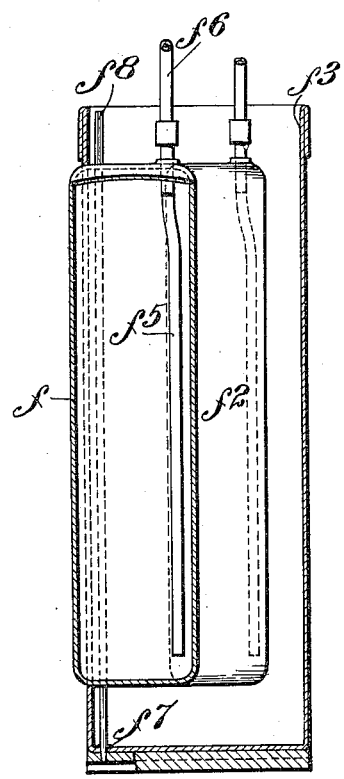

Figure 1 is a vertical section on line $x^1$ of Fig. 2; Fig. 2 is a partial plan view showing the general arrangement of the counter, the end of the counter above the water cooling container being cut away, and the ice cream cooler being shown partly in section; Fig. 3 is a side elevation, partly in section, of the water cooling container; and Fig. 4 is a section on line $x^4$ of Fig. 3.

In the construction shown, the dispensing faucets $a$, $a^2$, $a^3$ and $a^4$, for the soda and mineral waters are shown as behind the counter $b$, while the syrup jars $c$ are arranged in a chamber $c^2$ which is below the counter, the syrup faucets $c^3$ being at the tops of the syrup receptacles, as shown in Fig. 1. The chamber $c^2$ is formed above the main cooling tank or chest $d$, which is shown as rectangular, having walls provided with thermal insulating material $d^2$, the said tank having a partition $d^3$ near the front, so as to form an air space $d^4$. At the rear of the chamber $d$ there is located a cooler $e$ adapted to contain a can $e^2$ for ice cream, there being a removable cover $d^5$ at the back of the chamber $d$ below the dispensing faucets to render the ice cream accessible for serving. The ice cream is commonly kept cool by a freezing mixture, usually ice and salt, and, in accordance with the invention, the same cooling mixture is utilized to cool the water as it passes from the source of supply to the dispensing faucets. To this end, the coolers, which consist of ducts or cylinders $f$ and $f^2$, are located in a rectangular container $f^3$ which fits between the partition $d^3$ and the main portion of the chamber $d$ which contains the freezing mixture. The part, therefore, which is filled with the freezing mixture is inclosed on three sides by the insulated walls of the main chamber, and on the fourth side by the water cooler, so that absorption of heat takes place mainly through the walls of the water cooler, thus chilling the water which passes through the said cooler.

Ordinarily, the plain soda is used to the largest extent, and the apparatus is, therefore, shown as provided with a plurality of soda cooling cylinders $f$, the inlet pipe $f^4$ which leads from the carbonator or other source of supply (not shown) entering at one end and extending nearly to the bottom of the cylinder at that end, while the water passes from said cylinder through a pipe $f^5$ leading from the top of the first cylinder to the bottom of the next. A similar connection is made between succeeding cylinders, the water finally passing to the dispensing faucet $a$ through the pipe $f^6$ which passes out from the top of the last cylinder. In the construction shown, the walls of these cylinders are caused to project through and beyond the wall of the receptacle $f^3$, so that the ice is actually in contact with the walls of the cylinders themselves, which are comparatively thin, so that the heat is rapidly drawn from the contents of the cylinders. The coolers $f^2$ for the various mineral waters are shown as smaller cylinders arranged behind the soda cylinders $f$, and preferably in contact therewith, there being three separate coolers shown for different waters, each having a separate inlet pipe and an outlet pipe leading to a dispensing faucet.

In order to equalize the temperature around the various coolers, so that the absorption of heat from all will be approximately the same, the cooling tank can be filled with water, which will become chilled throughout, the water withdrawing the heat from the several cooling cylinders, and giving up the heat to the ice in the main portion of the tank. In practice, it is found that the water in the container will freeze along the side of the cooling tank which is next to the freezing mixture, and the ice formed will keep the rest of the water down to the desired temperature, although the greater part of the water in the tank remains in liquid form. The part where the temperature is lowest is, therefore, adjacent to the coolers through which the fresh uncooled water is most frequently drawn.

The container is shown as provided with a drain opening $f^7$ leading into a space below the container, said drain opening having a plug or stopper provided with a handle $f^8$ extending upward to the top of the container, where it is easily accessible. The space below the container is part of the main tank $d$, which is provided with an overflow pipe $e^3$, which extends from the top to the bottom of the tank and constitutes a plug or stopper for a drain opening $e^4$. The pipe $e^3$ is provided with an overflow opening $e^5$ at any desired level, and, if it is desired to drain the tank and container completely, the pipe $e^3$ can be lifted, thus opening the drain orifice at the bottom.

It is to be noted that the cooling container constitutes an element complete in itself, so that it can be readily removed from the main tank; and, furthermore, it is obvious that the cooling container may be used in connection with any apparatus or device provided with means for retaining a suitable freezing mixture in position to affect the container externally.

Claims:

1. In a dispensing apparatus, the combination with a main tank adapted to contain a refrigerant, and being provided with a partition adjacent to one of its walls to form an air space; of a container for a substance capable of convection of heat, said container being located adjacent to said partition; and a receptacle within said container, said receptacle constituting a cooling duct for fluid, and being so located that a part of the wall of said receptacle projects through the wall of said container at the side opposite the partition into direct contact with the refrigerant contained in the main portion of the tank.

2. In a dispensing apparatus, the combination with a tank adapted to contain a refrigerant; of an ice cream cooler in the main portion of said tank adapted to be surrounded by the refrigerant; a partition adjacent to one wall of the tank to form an air space; and a container for a liquid capable of convection of heat, said container being located between said partition and the portion of the tank which contains the receptacle for the ice cream cooler; and one or more receptacles constituting cooling ducts located within said container, a part of the wall of each receptacle projecting through that wall of the container which is adjacent to the main portion of the tank.

3. A cooling device comprising a container adapted to contain a liquid, and having within it a plurality of cooling receptacles provided with inlets and outlets for the flow of fluid, a portion of each receptacle projecting through one wall of the container; a tank in which said container is located, the container being so located in the tank that the wall of the container, through which the receptacles project, constitutes an abutment for the refrigerant in the tank; a partition adjacent to the opposite wall of said container, there being a space between said partition and the wall of the tank; and an ice cream cooler located in that portion of the tank which contains the refrigerant.

4. A cooling device comprising a container for a liquid, or like substance capable of convection of heat, combined with one or more cooling receptacles contained therein, the walls of which extend through one of the walls of said container; one or more cooling receptacles wholly within the container; and a main tank adapted to hold a refrigerant, the container being so located in the tank as to form an abutment for the refrigerant.

In testimony whereof, I have signed my name to this specification in the presence of two subscribing witnesses.

EDWARD E. MURPHY.

Witnesses:
M. E. COULNEY,
JAS. J. MALONEY.

Copies of this patent may be obtained for five cents each, by addressing the "Commissioner of Patents, Washington, D. C."